(12) United States Patent
Suzuki et al.

(10) Patent No.: US 6,297,854 B1
(45) Date of Patent: Oct. 2, 2001

(54) CONTOUR EMPHASIZING CIRCUIT

(75) Inventors: Susumu Suzuki; Masanori Kurita, both of Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/402,027

(22) PCT Filed: Mar. 25, 1997

(86) PCT No.: PCT/JP97/00996

§ 371 Date: Sep. 24, 1999

§ 102(e) Date: Sep. 24, 1999

(87) PCT Pub. No.: WO98/43411

PCT Pub. Date: Oct. 1, 1998

(51) Int. Cl.[7] .................................................. H04N 5/208
(52) U.S. Cl. ............................................ 348/625; 348/630
(58) Field of Search ..................................... 348/625, 630, 348/627, 628, 629, 631; 382/206; H04N 5/21, 5/208

(56) References Cited

U.S. PATENT DOCUMENTS 5,767,900 * 6/1998 Tanji ...................................... 348/625

FOREIGN PATENT DOCUMENTS

| 1-259464 | 10/1989 | (JP) . |
| 2-213283 | 8/1990 | (JP) . |
| 4-357776 | 12/1992 | (JP) . |
| 5-91440 | 4/1993 | (JP) . |
| 5-268500 | 10/1993 | (JP) . |
| 8-65548 | 3/1996 | (JP) . |
| 8-163412 | 6/1996 | (JP) . |
| 8-186 739 | 7/1996 | (JP) . |

* cited by examiner

*Primary Examiner*—Sherrie Hsia
(74) *Attorney, Agent, or Firm*—Flynn, Thiel, Boutell & Tanis, P.C.

(57) ABSTRACT

A contour emphasizing circuit is provided with a Y-signal generating circuit (36) which generates luminance signals from digital R, G, and B signals, a contour extracting circuit (38) which extracts contour components from the generated Y-signal, a coefficient multiplying circuit (42) which outputs contour components for R, G, and B by multiplying the extracted contour components by coefficients Kr, Kg, and Kb, addition circuits (34$r$, 34$g$, and 34$b$), and a contour emphasis enabling circuit (39) which controls the period for which contour components extracted by the extracting circuit (38) arc supplied. Therefore, the contour emphasizing circuit prevents process errors in the peripheral portion of the screen of a display.

10 Claims, 10 Drawing Sheets

Fig. 1 (Prior Art)
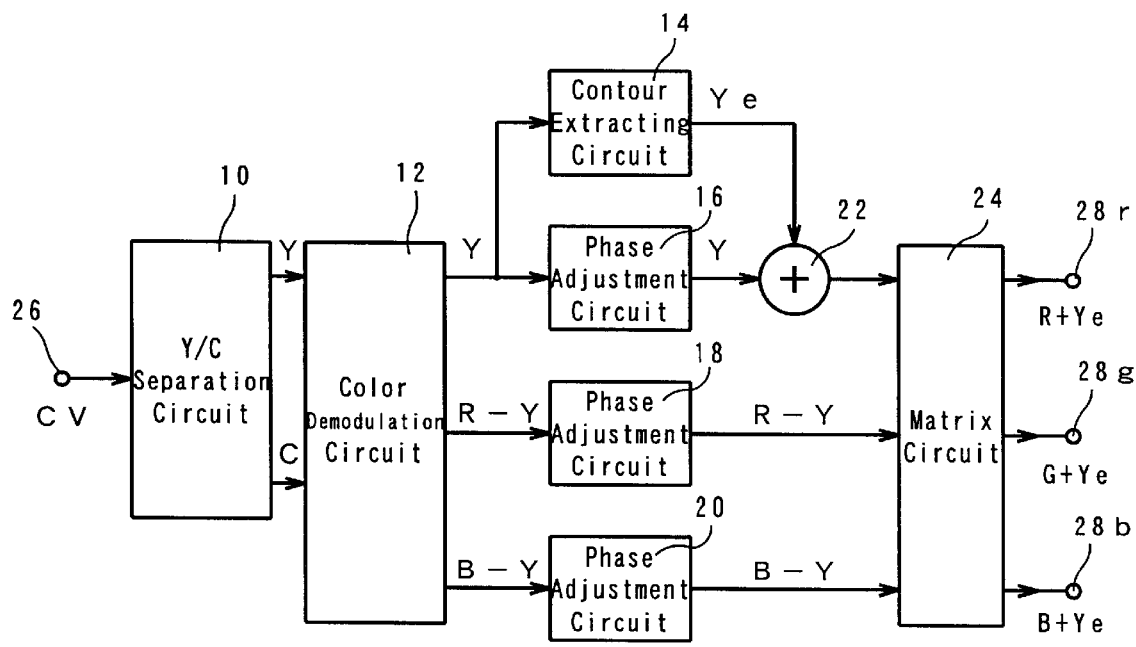
Fig. 2
(a) A/D conversion when large signal is input
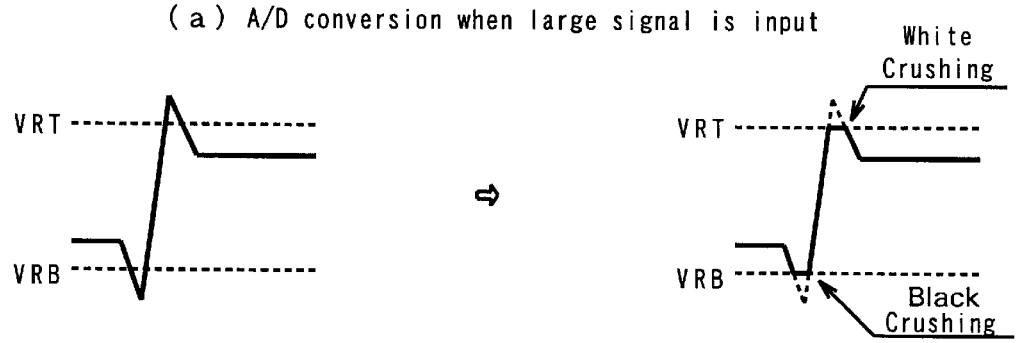
(b) A/D conversion when contour emphasizing quantity is "large"

Fig. 4(a)
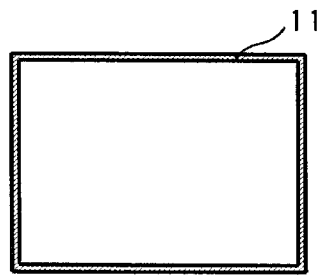
Fig. 4(b)
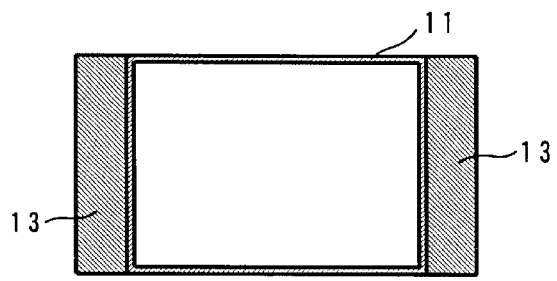
Fig. 5(a) Processing error in vertical direction
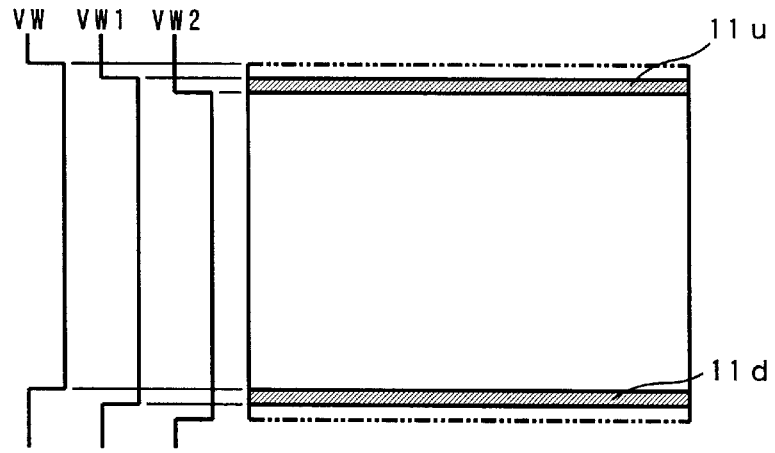
Fig. 5(b) Processing error in horizontal direction
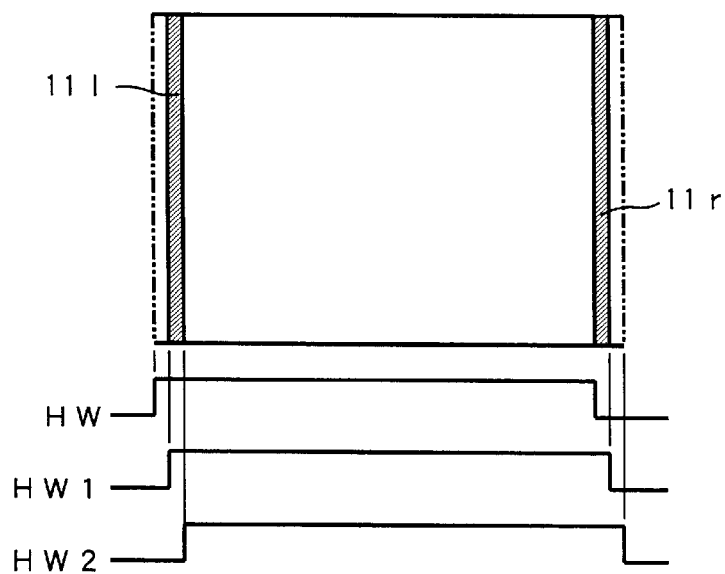

Fig. 13 (a)
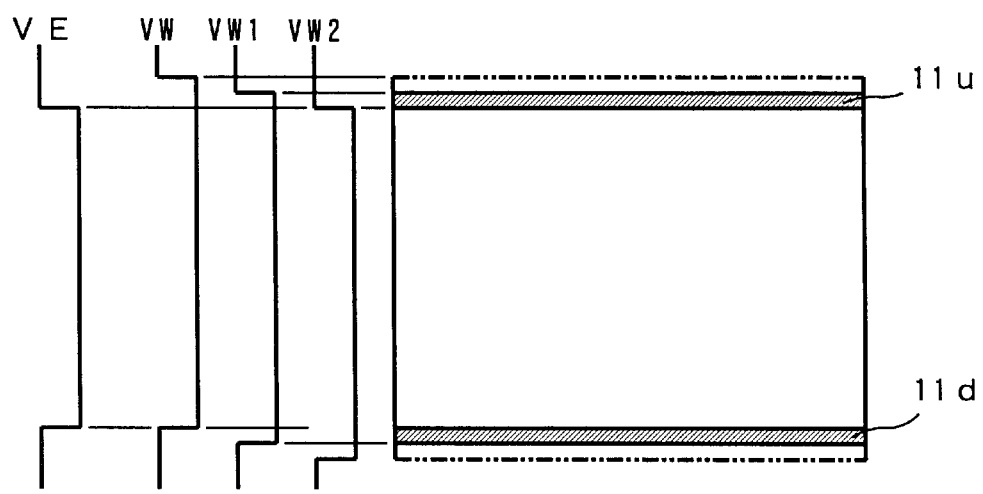
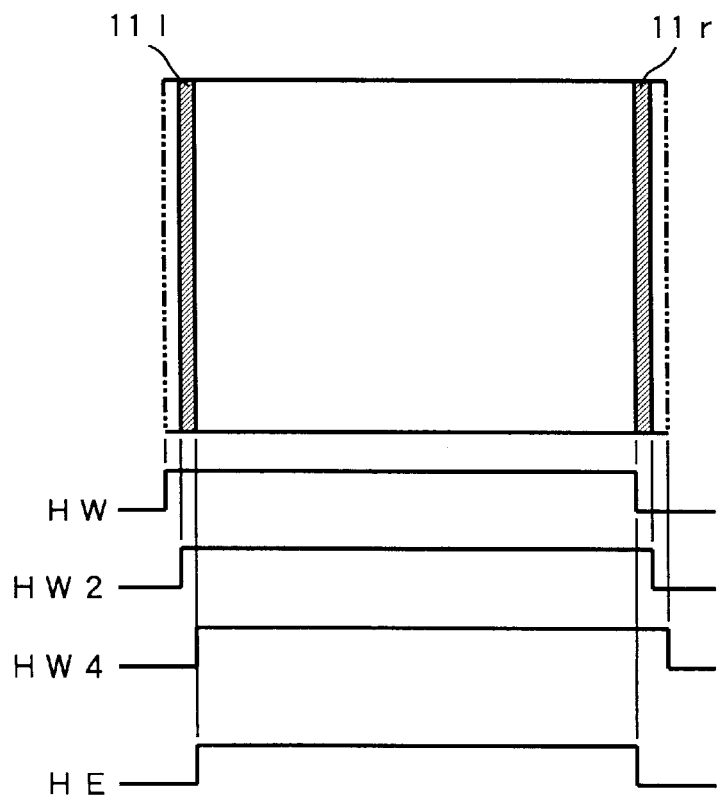
Fig. 13 (b)

CONTOUR EMPHASIZING CIRCUIT

TECHNICAL FIELD

The present invention relates to a contour emphasizing circuit, wherein a digital contour-emphasized video signal on the basis of the input of an analog signal is output, and is employed to indicate contour-emphasized color video signals by a display device (for example, matrix type display device) which is digital driven such as a plasma display (referred only to as PDP) and liquid crystal display (referred only to as LCD).

BACKGROUND ART

In the conventional CRT (Cathode Ray Tube) display device, the contour emphasizing processing is carried out aiming at high picture quality implementation and high-pass characteristic compensation. The contour emphasizing circuit to carry out this contour emphasizing processing is, as shown in FIG. 1, composed of an Y/C separation circuit 10, a color demodulation circuit 12, a contour extracting circuit, phase adjustment circuits 16, 18 and 20, an adder 22 and a matrix circuit 24.

The Y/C separation circuit 10 separates a Y (luminance) signal and a C (color) signal from the composite video signal (for example, compound color television signal) input to an input terminal 26, and the color modulation circuit 12 separates a Y signal, an R-Y (color difference) signal and a B-Y (color difference) signal on the basis of a Y signal and a C signal.

The contour extracting circuit 14 extracts a contour component Ye which is a high-pass component of a video signal on the basis of an adder 22.

The matrix circuit 24 prepares a signal adding the contour component Ye to the R (red), G (green) and B (blue) signals, respectively, on the basis of (Y+Ye) signals added by the adder 22, an (R-Y) and a (B-Y) signal phase-adjusted by phase adjustment circuits 18 and 20. That is to say, the matrix circuit 24 prepares R+Ye, G+Ye and B+Ye on the basis of the operations in following equations (1), (2) and (3). By outputting these R+Ye, G+Ye and B+Ye to the CRT display device by means of output terminals 28r, 28g and 28b, videos contour-emphasized by this CRT display device are displayed.

$$(R-Y)+(Y+Ye)=R+Ye \quad (1)$$

$$(G-Y)+(Y+Ye)=G+Ye \quad (2)$$

$$(B-Y)+(Y+Ye)=B+Ye \quad (3)$$

(G-Y) in the above equation (2) is generated by the following equation (4).

When a video contour-emphasized by a matrix type display device driven by digital video signals (for example, R, G and B signals) like PDP and LCD is displayed, each signal of (R+Ye), (G+Ye) and (B+Ye) obtained in output terminals 28r, 28g and 28b in FIG. 1 is output to the display device after being digitized by the A/D (analog/digital) conversion circuit. However, in such a prior example, when a large amplitude signal is input to an input terminal 26, or when the contour emphasizing quantity (or contour emphasizing coefficient, the description is omitted, as it is similar afterwards) is "large", there is a problem that the correct operation cannot be obtained over the dynamic range of A/D conversion circuit.

For example, in case a large amplitude signal is input to the input terminal 26, by outputting a signal over the dynamic range of the A/D conversion circuit as shown at the left-hand side in FIG. 2(a) from output terminals 28r, 28g and 28b, there are problems that signals exceeding an upper conversion reference voltage value VRT (for example, 5 volts) in the dynamic range as shown at the right-hand in said figure (a) are cut, resulting in producing white crushing or signals under the lower conversion reference voltage value VRT (for example, 3 volts) in the dynamic range are cut, resulting in producing black crushing.

Further, when the contour emphasizing quantity of the contour extracting circuit 14 is "large", there are problems that signals over the dynamic range of the A/D conversion circuit as shown at the left-hand side in FIG. 2(b) are cut, resulting in producing white crushing or signals under the lower conversion reference voltage value VRB are cut, resulting in producing black crushing.

The present applicant simultaneously proposes a contour emphasizing circuit as shown in FIG. 3 as a separate application to solve the above mentioned problems.

The contour emphasizing circuit shown in FIG. 3 consists of A/D conversion circuits 30r, 30g and 30b, a signal processing/phase adjustment circuit 32, contour adders 34r, 34g and 34b, a Y signal generation circuit, a contour extracting circuit 38, a gain controller 40 for the contour component and a coefficient multiplication circuit 42.

Hence, analog R, G and B signals input to input terminals 44r, 44g and 44b are converted to digital signals by A/D conversion circuits 30r, 30g and 30b, signal-processed and phase-adjusted by the signal processing/phase adjustment circuit 32, and input to contour adders 34r, 34g and 34b. The Y signal generation circuit 36 generates Y signals from digital R, G and B signals, the contour extracting circuit 38 extracts contour components from Y signals, these extracted contour components input to contour adders 34r, 34g and 34b through the gain controller 40 and coefficient multiplication circuit 42, are added to the original digital R, G and B signals, and supplied to the display device through output terminals 86r, 86g and 86b.

As described above, it has been designed that by adding the contour components after the conversion to digital R, G and B signals by A/D conversion circuits 30r, 30g and 30b, the contour emphasizing component as a conventional example does not surpass the dynamic range of the A/D conversion circuit. For this reason, when the analog R, G and B signals input to input terminals 44r, 44g and 44b in FIG. 3 are large amplitude signals, or even when the contour emphasizing quantity is "large", neither white crushing nor black crushing is produced when outputting signals from the contour emphasizing circuit in FIG. 3 to the display device driven by digital R, G and B signals and the contour-emphasized video is expressed.

However, in the contour emphasizing circuit shown in FIG. 3, since the contour extracting circuit 38 extracts a vertical contour component on the basis of signals delayed by a specified number of lines (for example, portion of 1 or 2 lines), a Y signal generated by the Y signal generation circuit 36 and this signal, and a horizontal contour component is extracted on the basis of signals delayed by a specified number of dots (for example 2 or 4 dots), a Y signal delayed by a specified number of lines (for example, portion of 1 line) and this Y signal, as shown in FIG. 4(a) and (b), there is a problem that a processing error (for example, white edge) is produced in the periphery 11 of the display screen. FIG. 4(a) shows the case when the aspect ratio displays a video of 4:3 in a general purpose television set whose aspect ratio is 4:3, the same figure (b) shows the case wherein the aspect ratio displays a video of 4:3 in a wide television set whose aspect ratio is 16:9, and 13 indicates the side color (for example, black) without video display.

That is to say, in FIG. 4(a), the periphery 11 of the display screen corresponds to the blanking portion of the video and the boundary portion of an effective video signal, in the same figure (b), the top and bottom of the periphery 11 correspond to the blanking portion of the video and the boundary portion of the effective video signal, the right and left of periphery 11 correspond to the side color 13 and the boundary portion of the effective video signal, and since the contour extracting processing is carried out between lines or between dots without correlation to these boundary portions of effective video signal, thereby a contour emphasizing processing error comes to be produced by the interference between the insignificant signal and the significant signal.

For example, in the boundary portion of the effective video signal described above, as shown in FIG. 5(a), since the vertical display area signal VW and the vertical contour component by the Y signals corresponding to signals VW1 (display video and same phase) and VW2 which delayed a vertical display area signal VM and this vertical display area signal VW for 1 line and 2 lines are extracted, large contour components are extracted in the upper edge (portion of 1 line) 11u and lower edge (portion of 1 line) 11d of the display screen, and the contour emphasizing processing becomes excessive, resulting in deterioration of the picture quality. Besides, as shown in FIG. 5(b), since the horizontal contour components are extracted by Y signals corresponding to a signal HW1 (display video and same phase) and HW2 which delayed the horizontal display area signal HW and this horizontal display area signal HW1 in the portion of 1 line and in the portion of 2 lines, large contour components are extracted in the left-hand edge (in the portion of 2 dots) 11l and right-hand edge (in the portion of 2 dots) 11r of the display screen, the contour emphasizing processing comes to be excessive, resulting in deterioration of the picture quality.

The present invention has been carried out taking into account problems described above, when a large amplitude is inputted, or even when a contour emphasizing quantity is "large", which aims at realizing a contour emphasizing circuit that can display a contour emphasizing video without white crushing or black crushing in a display device driven by digital video signals as well as preventing the production of a contour emphasizing processing error in the display portion corresponding to the boundary portion of the effective video signal.

DISCLOSURE OF THE INVENTION

The contour emphasizing circuit shall be characterized by being provided with an A/D conversion circuit for converting analog color video signals, (for example, R, G and B signals) to digital color video signals, a Y signal generation circuit for generating a Y signal from an output signal of this A/D conversion circuit, a contour extracting circuit for extracting a contour component from the Y signal generated by this Y signal generation circuit and a contour adder for outputting a signal contour-emphasized by adding a contour component extracted by this contour extracting circuit to an output signal of the A/D conversion circuit, and installing a contour emphasizing enabling circuit for controlling a period in which a contour component extracted by the contour extracting circuit is supplied to the contour adder.

Since a Y signal is generated after converting analog color video signals to digital signals by the A/D conversion circuit and a contour component extracted from this Y signal is added to a digital color video signal output from the A/D conversion circuit, the contour emphasizing component does not surpass the dynamic range of A/D conversion circuit as in the case in FIG. 1. For this reason, when analog color video signals input to the contour emphasizing circuit of the present invention are large amplitude signals, or even when the contour emphasizing quantity is "large", neither white crushing nor black crushing is produced when the contour emphasizing video displays a signal output from the contour emphasizing circuit of the present invention to the display device driven by digital video signals.

Further, since a contour emphasizing enabling circuit for controlling the period in which the contour component extracted by the contour extracting circuit is supplied to the contour adder, by not adding the contour component wherein a contour emphasizing processing error is produced by this contour emphasizing enabling circuit to the display portion, it is capable of preventing the production of a processing error in the periphery 11 of the display screen shown in FIG. 4(a) and (b).

Hence, to simplify the configuration of the contour emphasizing enabling circuit, the simple contour emphasizing enabling circuit is constituted by an enabling signal generation circuit for generating a contour emphasizing enabling signal on the basis of the display area signal and a contour addition control circuit for controlling whether or not the contour component is supplied to the contour adder on the basis of the existence of a contour emphasizing enabling signal generated by this enabling signal generation circuit.

Further, to jointly have functions whether or not to control the contour emphasizing, an output control circuit is installed to determine whether or not an enabling signal generated by the enabling signal generation circuit is output with a control signal for whether or not contour emphasis is carried out.

Further, to prevent the contour emphasizing processing error in the boundary portion in vertical direction and in horizontal direction of the effective video signal, the enabling signal generation circuit is provided with a vertical enabling signal generation circuit for generating a contour emphasizing enabling signal in the vertical direction, a horizontal enabling signal generation circuit for generating contour enable signals and an OR circuit to output an OR signal of the contour emphasizing enabling signal in the vertical direction and in the horizontal direction as a contour emphasizing enabling signal.

Further, to make the contour emphasizing screen without the contour emphasizing processing error being large, the contour extracting circuit is constituted by first and second line memories, a vertical contour extracting circuit, a contour emphasizing frequency setting circuit, the vertical enabling signal generation circuit is constituted by a delay circuit for the vertical direction to output VW1 and VW2, delaying the vertical display area signal VW gradually in the portion of 1 line and an AND circuit for the vertical direction to output AND signals of vertical display area signals VW, VW1 and VW2 as contour emphasizing enabling signals in the vertical direction, and the horizontal enabling signal generation circuit is constituted by a delay circuit for the horizontal direction to output signals HW2 and HW4 which delayed horizontal display area signals HW gradually in the portion of 2 dots) and an AND circuit for the horizontal direction to output AND signals of horizontal display area signals HW, HW2 and HW4 as contour emphasizing enabling signals in the horizontal direction.

Further, to eliminate the influence of noise, in the contour extracting circuit, a core ring circuit for suppressing a contour component of less than a certain level is installed.

Further, to be capable of making the contour emphasizing quantity large, a contour component gain controller for adjusting the size of the contour component supplied from the contour extracting circuit through the contour emphasizing enabling circuit and a coefficient multiplication circuit for multiplying coefficients Kr, Kg and Kb of less than 1 to signals output from the contour component gain controller and outputting to the contour adder are installed.

BRIEF EXPLANATION OF THE DRAWINGS

FIG. 1 is a block diagram showing a contour emphasizing circuit of a conventional example.

Since FIG. 2 shows the problems when signals obtained by the circuit in FIG. 1 are converted to digital signals by A/D conversion circuits and output to the display device driven by digital video signals, (a) is a drawing showing that white crushing and black crushing are produced when entering large amplitude signals, and (b) is a drawing showing that white crushing and black crushing are produced when the contour emphasizing quantity is "large".

FIG. 4 is an explanatory drawing of a contour emphasizing processing error produced by the circuit in FIG. 3, (a) is a drawing to show when the aspect ratio displays the video at 4:3 for a general purpose television set whose aspect ratio is 4:3, and (b) is a drawing to show in case the aspect ratio displays the video at 4:3 by a wide television set whose aspect ratio is 16:9.

FIG. 5 is a detailed explanatory drawing of FIG. 4(a), (a) is a drawing to show a processing error in the vertical direction, and (b) is a drawing to show a processing error in the horizontal direction.

FIG. 13 is an explanatory drawing showing the relation between the display screen and the contour emphasizing enabling signal generated inside the enabling signal generation circuit in FIG. 6, (a) is a drawing showing the relation between the upper edge 11u and the lower edge 11d of the display screen and contour emphasizing enabling signal VE in the vertical direction, and (b) is a drawing showing the relation between the left edge 11l and the right edge 11r of display screen and contour emphasizing enabling signal HE in the horizontal direction.

BEST MODE TO CARRY OUT THE INVENTION

Below, the present invention will be explained in detail on the basis of the attached drawings.

Figure 3:
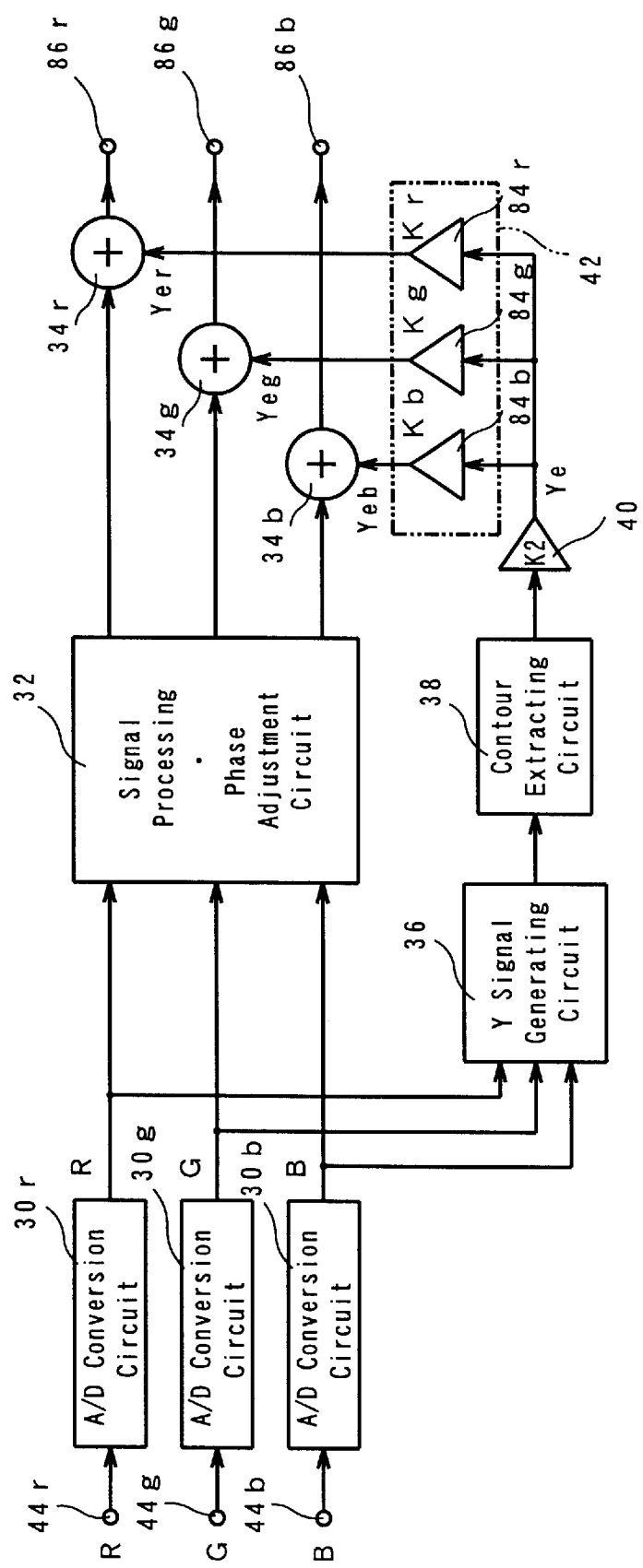
FIG. 3 is a block diagram of a contour emphasizing circuit of the present applicants simultaneously proposed as a separate application.
Figure 6:
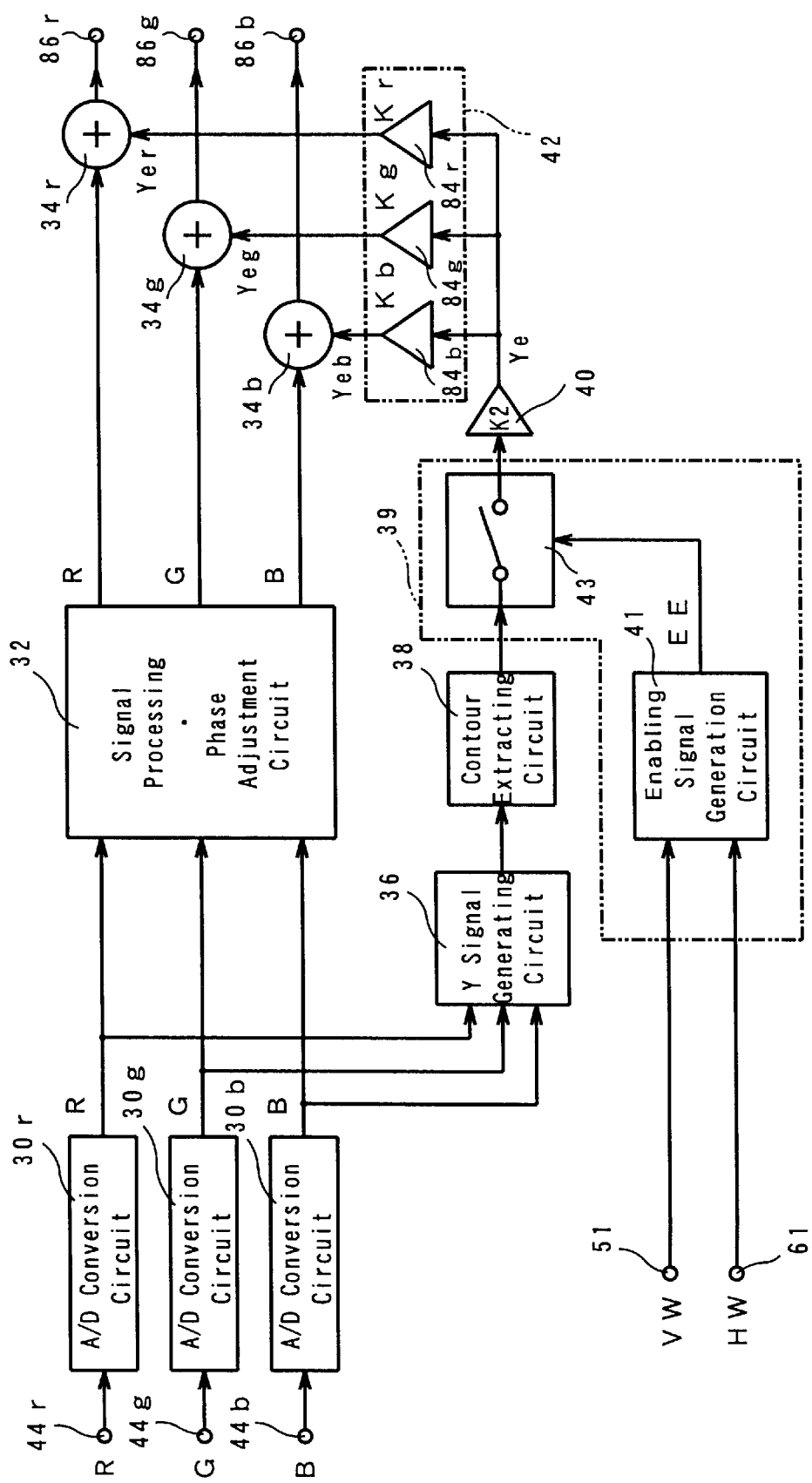
FIG. 6 is a block diagram showing an embodiment of a contour emphasizing circuit according to the present invention.

FIG. 6 shows an embodiment of the present invention, the same elements as FIG. 3 shall have the same codes. In this FIG. 6, numerals 30r, 30g and 30b denote A/D conversion circuits, numeral 32 is a signal processing/phase adjustment circuit, numerals 34r, 34g and 34b are contour adders, numeral 36 is a Y signal generation circuit, numeral 38 is a contour extracting circuit, numeral 39 is a contour emphasizing enabling circuit, numeral 40 is a gain controller of the contour component and numeral 42 is a coefficient multiplication circuit.

Said A/D conversion circuits 30r, 30g and 30b convert analog R, G and B signals input to input terminals 44r, 44g and 44b to digital R, G and B signals of 8-bits resolution.

Said signal processing/phase adjustment circuit 32 carries out the signal processing of picture element number conversion, gamma correction, etc. to R, G and B signals output from said A/D conversion circuits 30r, 30g and 30b, as well as carrying out the phase adjustment to adjust the delay difference. Said picture element number conversion, to meet the display picture number of the display device, expresses the processing for carrying out the rate conversion of the number of samples of 8-bits digital R, G and B signals, and said gamma-correction processing expresses the processing for correcting the light-emitting characteristics of the display device. Said phase adjustment employs a 1-dot delay element, etc. composed of a D-FF (D type flip flop), and expresses the processing for adjusting the delay difference between the delay time required for the signal processing of said picture element number conversion, gamma correction, etc. and the delay time required for the signal processing by said Y signal generation circuit 36, contour extracting circuit 38, contour emphasizing enable circuit 39, gain controller 40 and coefficient multiplication circuit.

Figure 7:
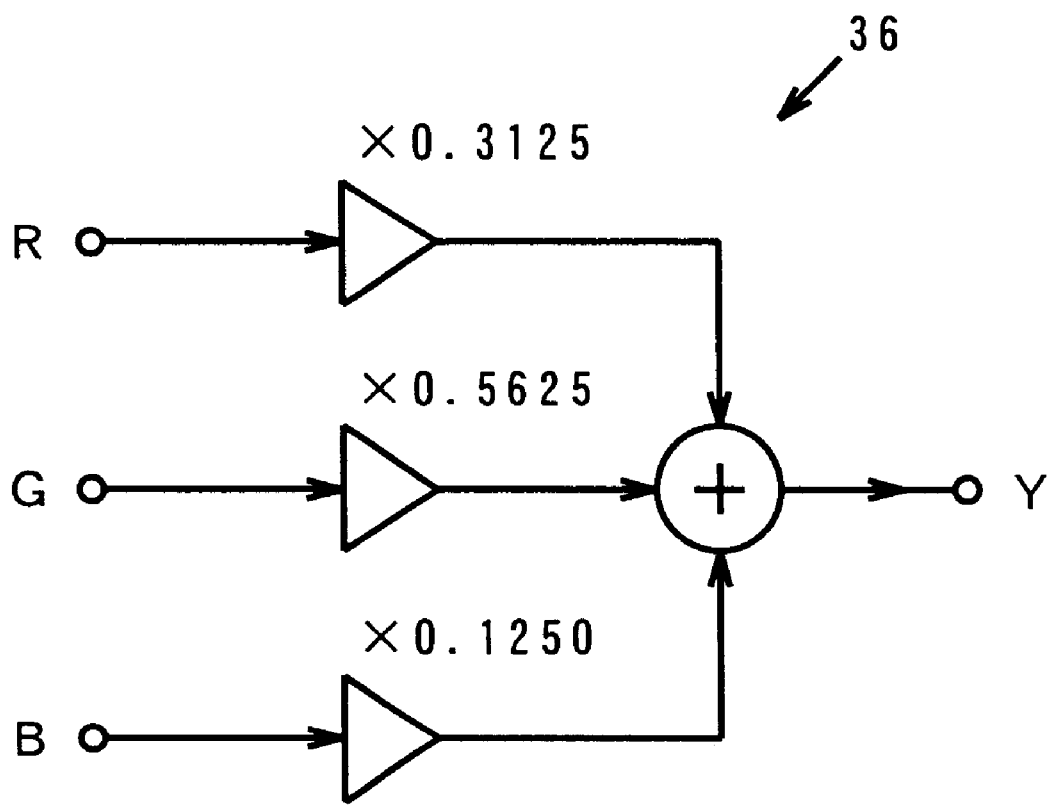
FIG. 7 is a block diagram showing an example of the Y signal generation circuit of FIG. 6.

Said Y signal generation circuit 36 is constituted so that Y (luminance) signals will be generated from digital R, G and B signals output from said A/D conversion circuit 30r, 30g and 30B. This Y signal generation circuit 36, for example, by using an ROM (Read Only Memory) as the LUT (Look Up Table) function, it is realized by the method for obtaining a Y signal by adding R, G and B signals at the mixing ratio established by the NTSC (National Television System Committee) to satisfy the following equation (5) or the method for obtaining an approximate value of a Y signal to satisfy following equation (6) by the bit shift addition shown in FIG. 7.

$$Y=(0.3\times R)+(0.59\times G)+(0.11\times B) \tag{5}$$

$$Y=0.3125\times R+0.5625\times G+0.1250\times B \tag{6}$$

Figure 8:
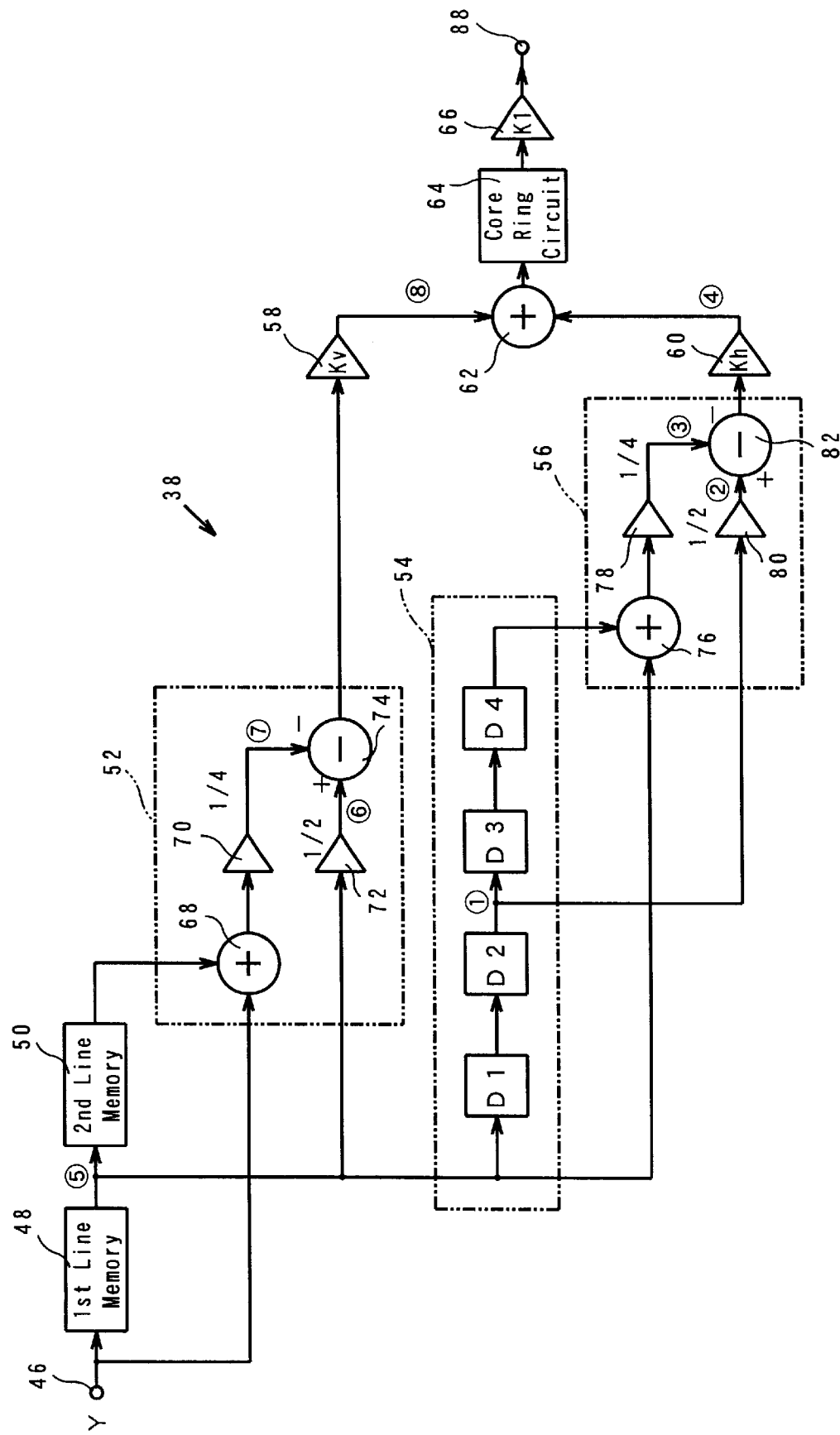
FIG. 8 is a block diagram showing an example of the contour extracting circuit in FIG. 6.

Said contour extracting circuit 38 extracts for output a contour component from a Y signal generated by said Y signal generation circuit 36. This contour extracting circuit 38 is shown in FIG. 8 specifically. In FIG. 8, numeral 46 denotes an input terminal for the Y signal, numerals 48 and 50 are first and second line memories as 1-line delay elements, numeral 52 is a vertical contour extracting circuit, numeral 54 is a contour emphasizing frequency setting circuit, numeral 56 is a horizontal contour extracting circuit, numeral 58 is a gain controller for the vertical contour component, numeral 60 a gain control for the horizontal contour component, numeral 62 is a contour synthesis circuit, numeral 64 is a core ring circuit, and numeral 66 is a gain controller.

Said first and second line memories 48 and 50 generate for output a Y signal input to said input terminal 46 and Y signals delayed by 1 line (portion of 1 scanning line).

Said vertical contour extracting circuit 52 consists of an adder 68 for adding for output a Y signal input to said input terminal 46 and a Y signal of 2-line delay output from said second line memory 50, a multiplier for multiplying for output a coefficient (¼) to an output signal of this adder 68, a multiplier 72 for multiplying for output a coefficient (½) to a Y signal of 1-line delay output from said first line memory 48, and a subtracter for subtracting an output signal of said multiplier 70 from an output signal of said multiplier 72.

Said contour emphasizing frequency setting circuit 54 is a circuit for setting the contour emphasizing frequency to the specified frequency (for example, ½ of the sampling frequency Fs), and specifically, as shown in FIG. 5, is constituted by the 5-tap type composed of four 1-dot delay elements D1 through D4 to delay Y signals output from said first line memory 48 gradually by 1 dot (portion of 1 picture element). Each of said 1-dot delay elements D1 through D4 is constituted, for example, by a D-FF (D type flip flop). In this respect, said contour emphasizing frequency setting circuit 54 is not limited to the 5-tap type, but may be of 7-tap type composed of six 1-dot delay elements D1 through D6 connected in series.

Said horizontal contour extracting circuit 56 consists of an adder 76 to add a Y signal output from said first line memory 48 and a Y signal of 4-dot delay output from the fourth 1-dot delay element D4, a multiplier 78 for multiplying for output a coefficient (¼) to an output signal of this adder 76, a multiplier 80 for multiplying for output a coefficient (½) to a Y signal of 2-dot delay output from the second 1-dot delay element D2, and a subtracter 82 for subtracting an output signal of said multiplier 78 from an output signal of said multiplier 80.

Said gain controller 58 multiplies for output an adjustable coefficient Kv to a vertical contour extracting component extracted by said vertical contour extracting circuit 52.

Said gain controller 60 multiplies for output the adjustable coefficient Kh to a horizontal contour extracting component extracted by said horizontal contour extracting circuit 56.

Said contour synthesis circuit 62 synthesizes for output the contour components output from each of said gain controllers 58 and 60.

Figure 9:
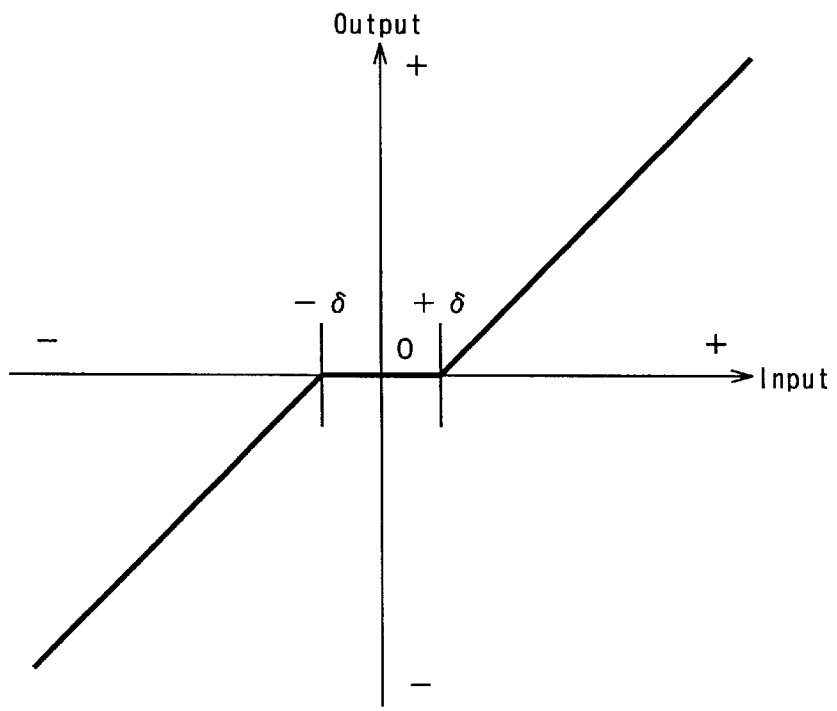
FIG. 9 is a characteristic drawing of the core ring circuit of FIG. 8.

Said core ring circuit eliminates noise and minute contour components from a contour component output from said contour synthesis circuit 62 by suppressing for output a contour component of less than a certain level of the contour component input. Said core ring circuit 64 is, for example, possesses an input/output characteristic as shown in FIG. 9. Specifically, if a contour component input from the contour synthesis circuit 62 is positive, larger than 0, it is added for output $-\delta$ ($\delta$ is a positive constant) to the original component, when it is negative, smaller than 0, it is to add for output $+\delta$ to the original component, as well, and when its operational result is more than $-\delta$ and less than $+\delta$, it fixes the output at 0.

Said gain controller 66 multiplies the adjustable coefficient K1 to a contour component output from the core ring circuit 64 and outputs to the output terminal 88.

Said contour emphasizing enable circuit 39 consists of an enabling signal generation circuit and a contour addition control circuit 43.

Said enabling signal generation circuit 41 outputs a contour emphasizing enabling signal EE on the basis of the input of vertical display area signal VW and horizontal display area signal HW.

Figure 10:
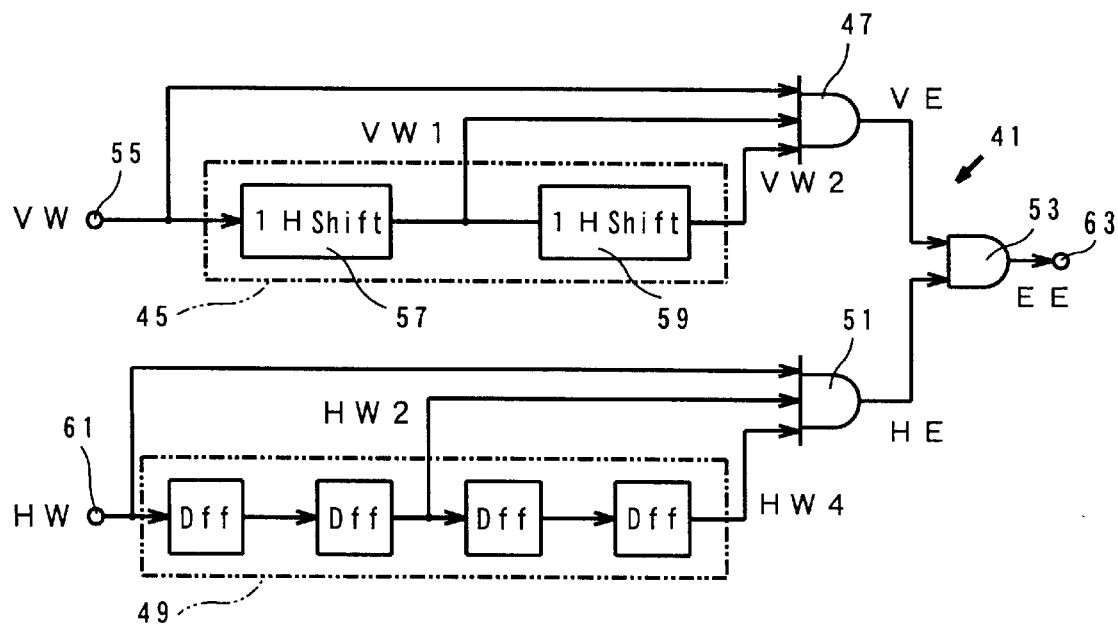
FIG. 10 is a block diagram showing an example of the enabling signal generation circuit in FIG. 6.

Said enabling signal generation circuit 41 is, specifically, as shown in FIG. 10, constituted of a delay circuit 45 for the vertical direction and an AND circuit 47, a delay circuit 49 for the horizontal direction and an AND circuit 51, and an AND circuit 53.

Said delay circuit for the vertical direction 45 is not limited to this, but to match it with the delay quantity of the first and second line memories 48 and 50 of said contour extracting circuit 38, consists of 1H shift circuits 57 and 59 for outputting signals VW1 and VW2 from delayed vertical display area signals VW input in the input terminal 55 gradually by 1 line, said AND circuit 47 for the vertical direction outputs vertical enabling signals VE from AND input signals of the vertical display area signals VW, VW1 and VW2.

Said delay circuit for the horizontal direction is not limited to this, but to agree with the delay quantity of the contour emphasizing frequency setting circuit 54 of said contour extracting circuit 38, comprises four D type flip flops D-FF to output signals HW2 and HW4 from delayed horizontal display area signals HW input in the input terminal 61 gradually by 2 dots, said AND circuit for the horizontal direction outputs horizontal enabling signals HE from AND input signals of the horizontal display area signals HW, HW2 and HW4.

Said AND circuit 53 outputs contour emphasizing enabling signals EE from AND signals of the vertical enabling signal VE and horizontal enabling signal HE.

Said contour addition control circuit 43 is inserted between said contour extracting circuit 38 and said gain controller 40, and on the basis of the existence of contour emphasizing enabling signals EE from said enabling signal generation circuit 41, controls by on or off whether or not a contour component extracted by said contour extracting circuit 38 is supplied to said gain controller 40.

Said gain controller 40 multiplies for output an adjustable coefficient K2 to a contour component output from said contour extracting circuit 38.

One of said gain controllers 66 and 40 may be omitted (for example, 66) as need rises.

Said coefficient multiplication circuit 42 is constituted by multipliers 84*r*, 84*g* and 84*b* for outputting contour components Yer, Yeg and Yeb for R, G and B and for multiplying coefficients Kr, Kg and Kb to a contour component Ye output from said gain controller 40. Said coefficients Kr, Kg and Kb are not limited to this, but are set to the same values of 0.3125, 0.5625 and 0.1250 (Kr+Kg+Kb=1) as the coefficients of R, G and B (FIG. 7) employed in said Y signal generation circuit 36 to generate a Y signal, and it is set to be obtained by bit shift addition.

Said contour adders 34*r*, 34*g* and 34*b* add contour components Yer, Yeg and Yeb output from coefficient devices 84*r*, 84*g* and 84*b* of said coefficient multiplication circuit 42 to R, G and B signals signal processed and phase adjusted by said signal processing/phase adjustment circuit 31, and outputs them to the display device through output terminals 86*r*, 86*g* and 86*b*.

Next, functions will be explained.

(1) In FIG. 6, analog R, G and B signals input to input terminals 44r, 44g and 44b are converted to 8-bits digital R, G and B signals by A/D conversion circuits 30r, 30g and 30b, signal-processed and phase-adjusted by the signal processing/phase adjustment circuit 32, and input to the input side of one side of contour adders 34r, 34g and 34b.

(2) The Y signal generation circuit 36 generates Y signals from digital R, G and B signals output from A/D conversion circuits 30r, 30g and 30b. For example, this Y signal generation circuit 36 generates Y signals from digital R, G and B signals by bit shift addition employing the circuit in FIG. 7.

(3) The contour extracting circuit 38 extracts a contour component from the Y signals generated by the Y signal generation circuit 36. Next, the extraction function of a contour component by this contour extracting circuit 38 will be explained employing FIG. 8.

(3a) Referring to FIG. 11, functions for extracting a horizontal contour component which is a high-pass component in the horizontal direction of a Y signal will be explained.

Figure 11:
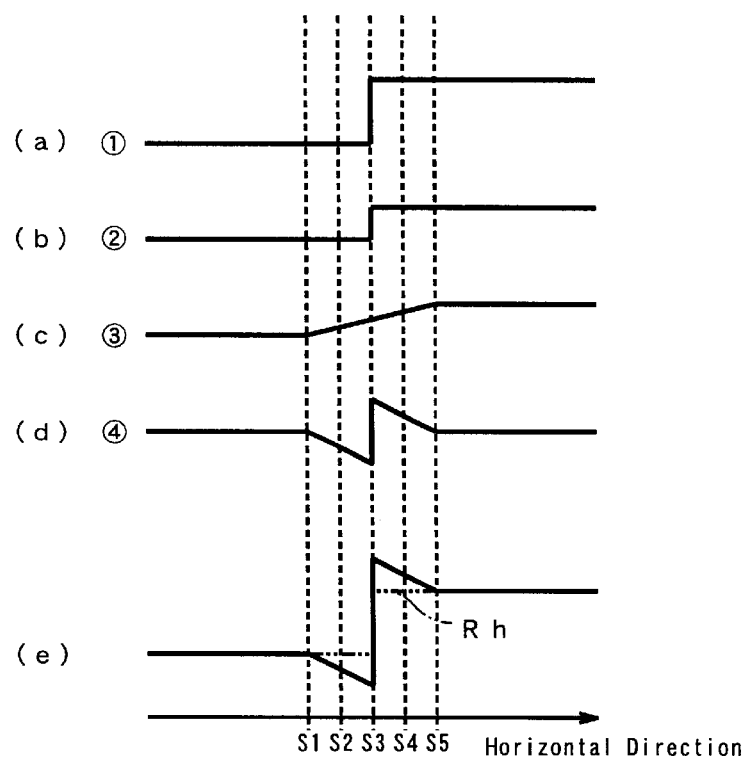
FIG. 11 shows signal waveforms relating to the contour emphasis in the horizontal direction, (a) is a waveform figure of signal (1) in FIG. 8, (b) is a waveform drawing of signal (2) in FIG. 8, (c) is a waveform drawing of signal (3) in FIG. 8, (d) is a waveform drawing of signal (4) in FIG. 8 and (e) is a waveform drawing of a component in the horizontal direction of a signal output to the output terminal 86r in FIG. 6.

Vertical lines S1, S2, S3, S4 and S5 expressed by dotted lines in FIG. 11 express sampling points of each picture elements successively lined in the horizontal direction along scanning lines including processed picture elements.

When outputting a Y signal from the second 1-dot delay element D2 of the contour emphasizing frequency setting circuit 54 as (1) as shown in FIG. 11(a), a signal (2) outputted from the multiplier 80 of the horizontal contour extracting circuit 56 becomes as shown in figure (b), and inputted to the + side of the subtracter 82.

The Y signal outputted from the first line memory 48 and the Y signal outputted from the fourth 1-dot delay element D4 of the contour emphasizing frequency setting circuit are added by the adder 76 of the horizontal contour extracting circuit 56, multiplied with ¼ by the multiplier 78, and inputted to the − side of the subtracter 82 as a signal (3), as shown in FIG. 11(c). Signals ((2) and (3)) are operated on by this subtracter 82 multiplied Kh times by the gain controller 60, and input in the input side of one side of the contour synthesis circuit 62 as a signal (4) shown in FIG. 11(d).

(3b) Referring to FIG. 12 functions for extracting a vertical contour component which is a high-pass component in the vertical direction of a Y signal will be explained.

Figure 12:
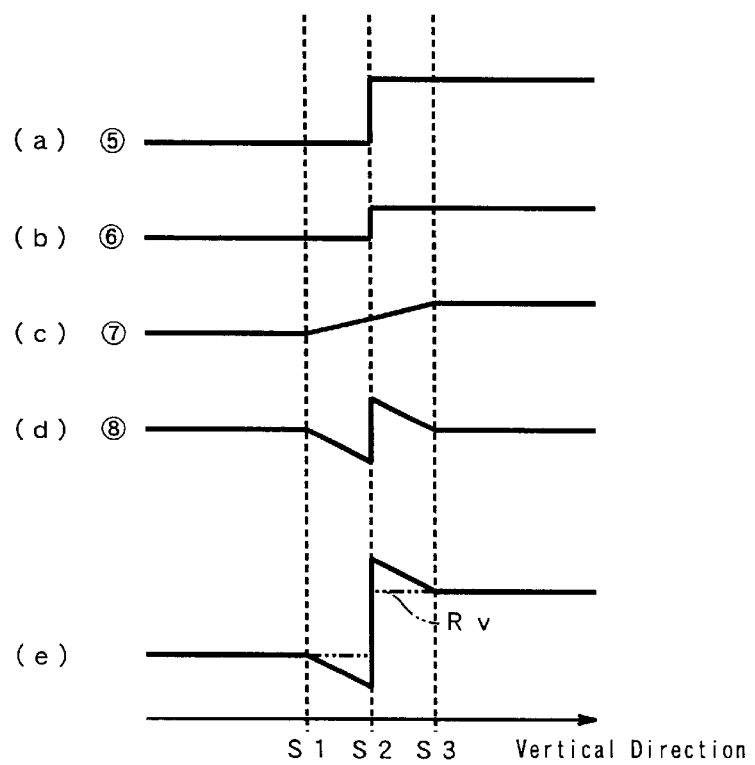
FIG. 12 shows the signal waveform relating to the contour emphasis in the vertical direction, (a) is a waveform drawing of signal in FIG. 8, (b) is a waveform drawing of signal±in FIG. 8, (c) is a waveform drawing of signal"in FIG. 8, (d) is a waveform drawing of signal>in FIG. 8, and (e) is a waveform drawing of a component in the vertical direction of a signal output to the output terminal 86r.

Vertical lines S1, S2 and S3 expressed by the dotted-lines in FIG. 12 are picture elements on 3 scanning lines. The scanning includes a picture element as an object of the processing and back and forward scanning lines, and express sampling points of 3 picture elements in order along the vertical direction including a picture element as an object of the processing.

When a Y signal of 1-line delay outputted from the first line memory 48 is (5) as shown in FIG. 12(a), a signal (6) outputted from the multiplier 72 of the vertical contour extracting circuit 52 becomes as shown in the same figure (b), and inputted in the + side of the subtracter 74. A Y signal inputted to the input terminal 46 and a Y signal of 2-line delay outputted from the second line memory 50 are added by the adder 68 of the vertical contour extracting circuit 52, multiplied by ¼ by the multiplier 70, and as shown in FIG. 12(c), inputs in the − side of the subtracter 74 as a signal (7). Signals ((6) and (7)) operated by this subtracter 74 are multiplied Kv times by the gain controller 58, and input in the input side of other side of the contour synthesis circuit 62 as a signal (8) shown in FIG. 12(d).

(3c) A signal (4) expressing a horizontal contour component and a signal (8) expressing a vertical contour compo-
nent are inputted to the contour synthesis circuit 62, a contour component of less than a certain level suppressed by the core ring circuit 64 and noise influence eliminated, multiplied by a coefficient K1 by the gain controller 66, level-adjusted, and output to the output terminal 88.

(4) The contour component output from the output terminal 88 of the contour extracting circuit 38 is, after the addition period is controlled by the contour emphasizing enabling circuit 39, level-adjusted by being multiplied by a coefficient by the gain controller 40, multiplied by coefficients Kr, Kg and Kb by multipliers 84r, 84g and 84B of the coefficient multiplication circuit 42, becomes contour components Yer, Yeg and Yeb for R, G and B, and inputted to the input side of the other side of the corresponding contour adders 34r, 34g and 34b. For this reason, the contour emphasizing quantity can be made large.

(5) Next, the functions for the addition period control of a contour component by the contour emphasizing enabling circuit 39 of said (4) will be explained referring to FIGS. 10 and 13.

(5a) Contour emphasizing enabling functions in the vertical direction will be explained.

In the enabling signal generation circuit 41 in FIG. 10, the delay circuit 45 for the vertical direction outputs vertical display area signals VW1 and VW2, which delays the vertical display area signal VW input to the input terminal 55 by 1 line and 2 lines, by the delay functions of 1H shift circuits 57 and 59.

The AND circuit 47 for the vertical direction, as shown also in FIG. 13(a), outputs AND signals of vertical display area signals VW, VW1 and VW2 as the contour emphasizing enabling signal in vertical direction.

(5b) Contour emphasizing enabling functions in the horizontal direction will be explained.

In the enabling signal generation circuit 41 in FIG. 10, the delay circuit 49 in the horizontal direction outputs horizontal display area signals HW2 and HW4 that delay the horizontal display area signal HW input to the input terminal 61 by 2 dots and 4 dots.

The AND circuit 51 for the horizontal direction, as shown also in FIG. 13(b), outputs AND signals of horizontal display area signals HW, HW2 and HW4 as contour emphasizing enabling signals HE in the horizontal direction.

(5c) The AND circuit 53 in FIG. 10 makes AND signals of contour emphasizing enable signals VE and HE in the vertical direction and in the horizontal direction as contour emphasizing enabling signals EE, and outputs to the contour addition control circuit 43 through the output terminal 63.

(5d) The contour addition control circuit in FIG. 6 controls whether or not a contour component extracted by the contour extracting circuit 38 is output to the gain controller 40, on the basis of the existence (H level or L level) of a contour emphasizing enabling signal EE outputted from the output terminal 63 of the enabling signal generation circuit 41. For this reason, with regard to the vertical direction, since the contour component is output to the gain controller 40 only for the period of V level of the contour emphasizing enabling signal in the vertical direction in FIG. 13(a), and does not output the contour component to the gain controller during the period of L level, no contour emphasizing processing error shown in the slanting line portions 11u and 11b is produced.

Further, with regard to the horizontal direction, since the contour component is output to the gain controller 40 only for the period of H level of a contour emphasizing enable signal HE in the horizontal direction in FIG. 13(b), the contour component is not output to the gain controller 40 for the period of L level, no contour emphasizing processing errors shown in the slanting portions 11*l* and 11*r* are produced.

(6) R, G and B signals signal-processed and phase adjusted by the signal processing/phase adjustment circuit 32 and contour components Yer, Yeg and Yeb for R, G and B output from multipliers 84*r*, 84*g* and 84*b* of the coefficient multiplication circuit 42 are added by contour adders 34*r*, 34*g* and 34*b*, output to the display device through output terminals 86*r*, 86*g* and 86*b*, and video contour-emphasized by this display device are displayed.

(7) At this time, the horizontal direction component of (R+Yer) signals outputted to the output terminal 86*r* becomes as shown in FIG. 11(*e*), the vertical direction component becomes as shown in FIG. 12(*e*). Rh and Rv shown by two-dotted chain lines in FIGS. 11 and 12(*e*) expresses the horizontal direction component and vertical direction component of a R signal outputted from the signal processing/phase adjustment circuit 32.

Likewise, both the horizontal direction component and vertical direction component of (G+Yeg) and (B+Yeb) outputted to output terminals 86*g* and 86*b* become similar to the horizontal direction component and vertical direction component of (R+Yer) signals outputted to the output terminal 86*r*.

(8) As described above, it has been designed that since a Y signal is generated after converting analog R, G and B signals by A/D conversion circuits 30*r*, 30*g* and 30*b*, and a contour component extracted from this Y signal is added to original digital R, G and B signals, the contour emphasizing component, unlike the conventional example shown in FIG. 1, does not surpass the dynamic range of the A/D conversion circuit. For this reason, when analog R, G and B signals input in the contour emphasizing circuit of the present invention are large amplitude signals or even when the contour emphasizing quantity is "large", when outputting signals from the contour emphasizing circuit of the present invention to the display device driven by digital R, G and B signals and displaying the video, neither white crushing nor black crushing is produced.

(9) Further, since it has been designed to install the contour emphasizing enabling circuit 39 to control the period wherein contour components extracted by the contour extracting circuit 38 are supplied to contour adders 34*r*, 34*g* and 34*b* to control the addition period of the contour components, it is possible so that the contour component is not added to the display portion where a contour emphasizing processing error is produced by this contour emphasizing enabling circuit 39, and it can be prevented from producing contour emphasizing processing errors in the periphery 11 (or 11*u*, 11*d*, 11*l* and 11*r*) of the display screen as shown in FIG. 4(*a*) and (b) (or FIG. 13(*a*) and (b)).

In said embodiment, it has been made so that the contour emphasizing enabling circuit will be constituted by an enabling signal generation circuit and a contour addition control circuit, but the present invention is not limited to this, it may be suitable that the contour component extracted by the contour extracting circuit is used to control the period supplied to the contour adder.

Figure 14:
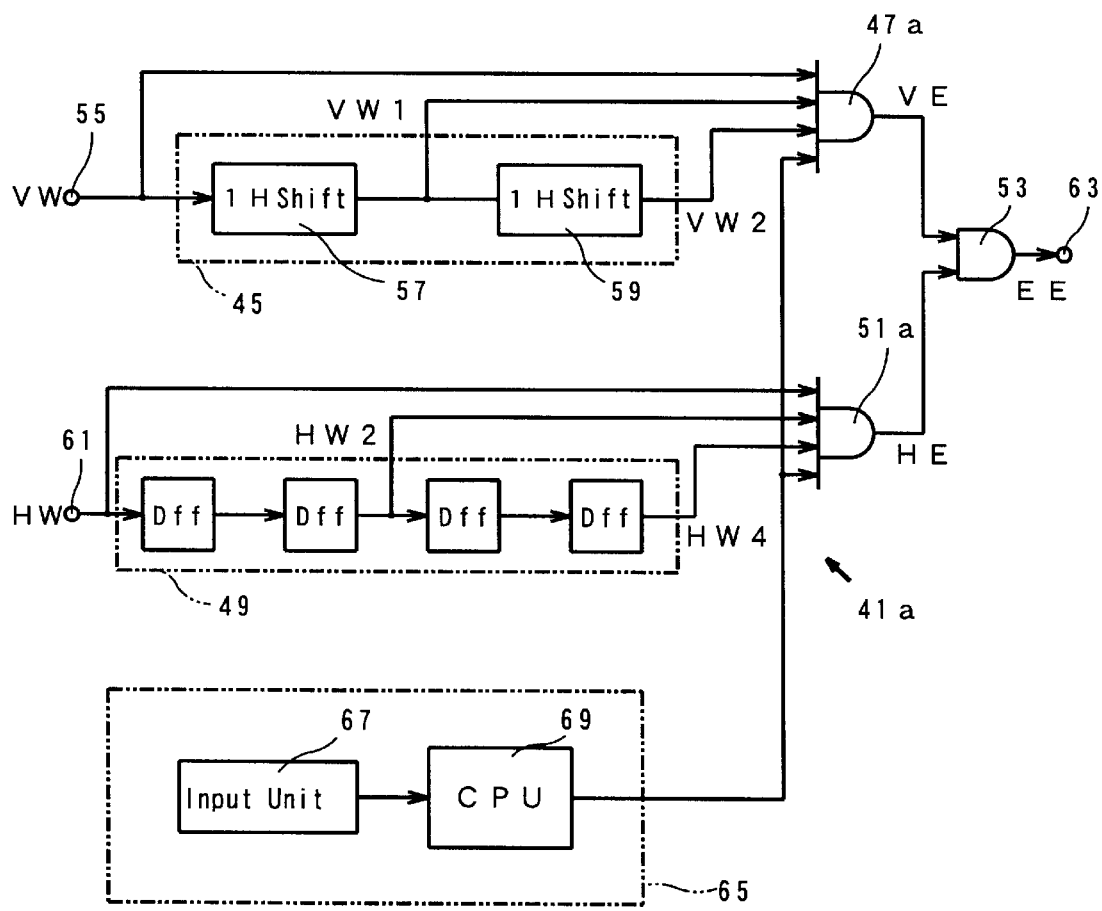
FIG. 14 is a block diagram showing other embodiment of the enabling signal generation circuit in FIG. 6.

For example, the contour emphasizing enabling circuit may be constituted by the enabling signal generation circuit 41*a* and output control circuit 65 shown in FIG. 14 and the contour addition control circuit 43 shown in FIG. 6. The enabling signal generation circuit 41 shown in this FIG. 14 is constituted by delay circuits 45 and 49, AND circuits 47*a* and 51*a* and an AND circuit 53 similar to FIG. 10, and the output control circuit 65 is constituted by an input unit 67 and CPU (Central Processing Unit). This output control circuit 65 is, for example, a part of the functions in the installed system mini-computer, and an ON-OFF control signal outputs from the CPU69 on the basis of the keying from the input unit 67 of the keyboard, remote controller, etc., and at the time of the On control signal, the contour component extracted by the contour extracting circuit 38 is fed to the gain controller 40, and at the time of the OFF control signal, the contour component extracted by the contour extracting circuit 38 is cutoff, and not fed to the gain controller. By installing this output control circuit 65, the functions for controlling whether or not the contour emphasis is carried out or not can be held jointly.

In said embodiment, first and second line memories 48 and 50 generating Y signals of 1-line delay and 2-line delay in the contour extracting circuit 38 are installed and coping with this, by installing the delay circuit 45 for generating vertical display area signals VW1 and VW2 of 1-line delay and of 2-line delay in enabling signal generation circuits 41 and 41*a*, a contour emphasizing processing error appeared in 1 line at upper and lower edges of the display screen is prevented and a display video area without processing error is made as large as possible, but the present invention is not limited to this.

For example, first and second line memories for generating Y signals of 2-line delay and 4-line delay are installed in the contour extracting circuit 38, coping with this, by installing a delay circuit to generate vertical display area signals VW1 and VW2 of 2-line delay and 4-line delay in enabling signal generation circuits 41 and 41*a*, the present invention can be utilized to prevent contour emphasizing processing errors appearing in 2 lines at upper and lower edges of the display video.

In said embodiment, the contour emphasizing frequency setting circuit 54 for generating Y signals of 2-dot delay and of 4-dot delay is installed in the contour extracting circuit 28, coping with this, by installing the delay circuit 49 for generating horizontal display area signals HW2 and HW4 of 2-dot delay and 4-dot delay in the enabling signal generation circuits 41 and 41*a*, contour emphasizing processing errors appearing in dots at left and right edge of the display video are prevented and a display video area without processing error is made as large as possible, but the present invention is not limited to this.

For example, the contour emphasizing frequency setting circuit for generating Y signals of 3-dot delay and of 6-dot delay is installed in the contour extracting circuit 38, coping with this, by installing a delay circuit for generating horizontal display area signals HW3 and HW6 of 3-dot delay and 6-dot delay to enabling signal generation circuits 41 and 41*a*, the present invention can be utilized also to prevent contour emphasizing processing errors from appearing 3 dots of the right and left ends of the display video.

In said embodiment, enabling signal generation circuits 41 and 41*b* are constituted by a delay circuit 45 and an AND circuit 53 for the vertical direction, a delay circuit 49 and an AND circuit 51 for the horizontal direction, and an AND circuit 53 for preventing contour emphasizing processing errors in the boundary portions in the vertical direction and in the horizontal direction of the effective video signals, however, the present invention is not limited to this, and can be utilized also with, at least, one side of a delay circuit and an AND circuit for the vertical direction, and a delay circuit and an AND circuit for the horizontal direction.

In said embodiment, by installing a gain controller 40 for adjusting for output the size of the contour component extracted by the contour extracting circuit 38 and the coefficient multiplication circuit 42 for outputting to contour adders 34r, 34g and 34b multiplying coefficients Kr, Kg and Kb (Kr+Kg+Kb=1) of less than 1 to its output signal, it has been designed to be able to enlarge the contour emphasizing quantity for R, G and B, but the present invention is not limited to this, however, and can be utilized by the gain controller 40 and the coefficient multiplication circuit 42 being omitted and the output of the contour extracting circuit 38 is directly output to contour adders 34r, 34g and 34b.

In said embodiment, within the contour extracting circuit 38, by installing a core ring circuit 64 for suppressing for output less than a certain level of the contour component output from the contour synthesis circuit 62, it has carried out to eliminate a noise influence, however, the present invention is not limited to this, and can omit this core ring circuit 64.

INDUSTRIAL AVAILABILITY

As above, the contour emphasizing circuit according to the present invention can be utilized to display a video of high picture quality contour-emphasized on the basis of the input of analog color video signals by the display device (for example, matrix type display device) driven by digital color video signals like PDP, LCD, etc. Further, it can be utilized to prevent from producing contour emphasizing processing errors in the display portion (for example, periphery) corresponding to a boundary portion of an effective video signal.

What is claimed is:

1. A contour emphasizing circuit comprising an A/D conversion circuit for converting input analog color video signals to output digital color video signals, a signal processing circuit for receiving the output digital color video signals and producing processed digital color video signals, a Y signal generation circuit for generating a Y signal from the output digital color video signals, a contour extracting circuit for extracting contour components from the Y signal, contour adders for adding the extracted contour components to the processed output digital color video signals and a contour emphasizing enabling circuit for controlling when the extracted contour components are supplied to the contour adders, wherein the contour emphasizing enabling circuit comprises an enabling signal generation circuit for generating a contour emphasizing enabling signal based on a display area signal and a contour addition control circuit provided between the contour extracting circuit and the contour adders for controlling whether or not the extracted contour components are supplied to said contour adders based on the contour emphasizing enabling signal, the enabling signal generation circuit comprising a vertical enabling signal generation circuit for generating a vertical contour emphasizing enabling signal based on a vertical display area signal, a horizontal enabling signal generation circuit for generating a horizontal contour emphasizing enabling signal based on a horizontal display area signal and an AND circuit for generating contour emphasizing enabling signals from AND signals of the vertical and horizontal contour emphasizing enabling signals generated by said vertical and horizontal enabling signal generation circuits.

2. The contour emphasizing circuit of claim 1, wherein the contour extracting circuit comprises first and second line memories connected in series for delaying the Y signal generated by the Y signal generation circuit, a vertical contour extracting circuit for extracting a vertical contour component on the basis of the Y signal generated from the Y signal generation circuit, a Y signal from the first line memory and a Y signal from the second line memory, a contour emphasizing frequency setting circuit comprising n 1-dot delay elements connected in series for generating two kinds of delayed Y signals consisting of an n-dot delayed Y signal from the $n^{th}$ 1-dot delay element and a two-dot delayed signal from the second 1-dot delay element for contour emphasizing frequency setting, based on the Y signal from said first line memory and n being at least four, a horizontal contour extracting circuit for extracting a horizontal component on the basis of the Y signal from the first line memory and the two kinds of delayed Y signals generated by the contour emphasizing frequency setting circuit and a contour synthesis circuit for synthesizing output contour components from said vertical and horizontal contour extracting circuits, respectively, the vertical enabling signal generation circuit comprising a vertical direction delay circuit for gradually delaying vertical display area signals VW by one line and a vertical direction AND circuit for outputting AND input signals of vertical display area signals VW1 and VW2, which are delayed by one line and two lines, respectively, and VW as vertical contour enabling signals, and a horizontal direction delay circuit for gradually delaying horizontal display area signals HW by 2 dots and a horizontal direction AND circuit for outputting AND input signals of horizontal display area signals HW2 and HW4, which are delayed by 2 dots and 4 dots, respectively, and HW as horizontal contour enabling signals.

3. The contour emphasizing circuit of claim 1, additionally comprising a core ring circuit for suppressing contour components of less than a specified level from being outputted.

4. The contour emphasizing circuit of claim 1, wherein the A/D conversion circuit converts analog R, G and B signals to digital R, G and B signals, the Y signal generation circuit generates Y signals from the digital R, G and B signals, the contour components extracted by the contour extracting circuit are adjusted in size in a gain controller, multiplied by coefficient Kr, Kg and Kb in a coefficient multiplication circuit, Kr, Kg and Kb being less than one, and added to the processed digital color video signals in the contour adders.

5. The contour emphasizing circuit of claim 1, wherein said vertical enabling signal generation circuit comprises two 1H shift circuits in series for gradually delaying input vertical display area signals by one line and an AND circuit for outputting the logical product of an input vertical area signal, a vertical area signal delayed by one line and a vertical area signal delayed by two lines, and said horizontal enabling signal generation circuit comprises four 1-dot delay circuits in series for gradually delaying input horizontal display area signals by one dot, and an AND circuit for outputting the logical product of an input horizontal area signal, a horizontal area signal delayed by two dots and a horizontal area signal delayed by four dots.

6. A contour emphasizing circuit comprising an A/D conversion circuit for converting input analog color video signals to output digital color video signals, a signal processing circuit for receiving the output digital color video signals and producing processed digital color video signals, a Y signal generation circuit for generating a Y signal from the output digital color video signals, a contour extracting circuit for extracting contour components from the Y signal, contour adders for adding the contour components to the processed digital color video signals and a contour emphasizing enabling circuit for controlling when the extracted contour components are supplied to the contour adders, wherein the contour emphasizing enabling circuit comprises an enabling signal generation circuit for generating a contour emphasizing enabling signal based on a display area signal, an output control circuit for controlling whether the enabling signal is output to allow contour emphasis to take place and a contour addition control circuit provided between the contour extracting circuit and the contour adders for controlling whether or not the extracted contour components are supplied to said contour adders based on the enabling signal, the enabling signal generation circuit comprising a vertical enabling signal generation circuit for generating a vertical contour emphasizing enabling signal based on a vertical display area signal, a horizontal enabling signal generation circuit for generating a horizontal contour emphasizing enabling signal based on a horizontal display area signal and an AND circuit for generating contour emphasizing enabling signals from AND signals of the vertical and horizontal contour emphasizing enabling signals generated by said vertical and horizontal enabling signal generation circuits.

7. The contour emphasizing circuit of claim 6, wherein the contour extracting circuit comprises first and second line memories connected in series for delaying the Y signal generated by the Y signal generation circuit, a vertical contour extracting circuit for extracting a vertical contour component on the basis of the Y signal generated from the Y signal generation circuit, a Y signal from the first line memory and a Y signal from the second line memory, a contour emphasizing frequency setting circuit comprising n 1-dot delay elements connected in series for generating two kinds of delayed Y signals consisting of an n-dot delayed Y signal from the $n^{th}$ 1-dot delay element and a two-dot delayed signal from the second 1-dot delay element for contour emphasizing frequency setting, based on the Y signal from said first line memory and n being at least four, a horizontal contour extracting circuit for extracting a horizontal component on the basis of the Y signal from the first line memory and the two kinds of delayed Y signals generated by the contour emphasizing frequency setting circuit and a contour synthesis circuit for synthesizing output contour components from said vertical and horizontal contour extracting circuits, respectively, the vertical enabling signal generation circuit comprising a vertical direction delay circuit for gradually delaying vertical display area signals VW by one line and a vertical direction AND circuit for outputting AND input signals of vertical display area signals VW1 and VW2, which are delayed by one line and two lines, respectively, and VW as vertical contour enabling signals, and a horizontal direction delay circuit for gradually delaying horizontal display area signals HW by 2 dots and a horizontal direction AND circuit for outputting AND input signals of horizontal display area signals HW2 and HW4, which are delayed by 2 dots and 4 dots, respectively, and HW as horizontal contour enabling signals.

8. The contour emphasizing circuit of claim 6, additionally comprising a core ring circuit for suppressing contour components of less than a specified level from being outputted.

9. The contour emphasizing circuit of claim 6, wherein the A/D conversion circuit converts analog R, G and B signals to digital R, G and B signals, the Y signal generation circuit generates Y signals from the digital R, G and B signals, the contour components extracted by the contour extracting circuit are adjusted in size in a gain controller, multiplied by coefficient Kr, Kg and Kb in a coefficient multiplication circuit, Kr, Kg and Kb being less than one, and added to the processed digital color video signals in the contour adders.

10. The contour emphasizing circuit of claim 6, wherein said vertical enabling signal generation circuit comprises two 1H shift circuits in series for gradually delaying input vertical display area signals by one line and an AND circuit for outputting the logical product of an input vertical area signal, a vertical area signal delayed by one line and a vertical area signal delayed by two lines, and said horizontal enabling signal generation circuit comprises four 1-dot delay circuits in series for gradually delaying input horizontal display area signals by one dot, and an AND circuit for outputting the logical product of an input horizontal area signal, a horizontal area signal delayed by two dots and a horizontal area signal delayed by four dots.

* * * * *